United States Patent
Wallace et al.

(10) Patent No.: US 9,558,538 B2
(45) Date of Patent: *Jan. 31, 2017

(54) DYNAMIC RANGE CONVERTER WITH FRAME BY FRAME ADAPTATION AND METHODS FOR USE THEREWITH

(71) Applicant: ViXS Systems, Inc., Toronto (CA)

(72) Inventors: Bradley Arthur Wallace, Austin, TX (US); Xiaowen Wu, Richmond Hill (CA)

(73) Assignee: ViXS Systems, Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,916

(22) Filed: Oct. 2, 2015

(65) Prior Publication Data

US 2016/0205371 A1 Jul. 14, 2016

Related U.S. Application Data

(63) Continuation-in-part of application No. 14/863,065, filed on Sep. 23, 2015.

(60) Provisional application No. 62/101,947, filed on Jan. 9, 2015.

(51) Int. Cl.
| | |
|---|---|
| *G06T 5/00* | (2006.01) |
| *H04N 5/20* | (2006.01) |
| *H04N 5/68* | (2006.01) |
| *H04N 9/67* | (2006.01) |
| *H04N 9/68* | (2006.01) |

(52) U.S. Cl.
CPC ............... *G06T 5/007* (2013.01); *H04N 5/20* (2013.01); *H04N 9/67* (2013.01); *H04N 9/68* (2013.01)

(58) Field of Classification Search
CPC ........ H04N 9/64; H04N 5/355; H04N 5/2355; H04N 19/98
See application file for complete search history.

(56) References Cited

U.S. PATENT DOCUMENTS

| | | | | |
|---|---|---|---|---|
| 5,387,896 A * | 2/1995 | Alappat | ................. | G01R 13/02 345/440 |
| 6,181,445 B1 * | 1/2001 | Lin | ...................... | H04N 1/6058 358/504 |
| 7,433,514 B2 * | 10/2008 | Sloan | ..................... | G06T 5/009 382/162 |

(Continued)

*Primary Examiner* — Brian Yenke
(74) *Attorney, Agent, or Firm* — Garlick & Markison; Bruce E. Stuckman

(57) ABSTRACT

In various embodiments, a dynamic range converter includes a first color space converter to convert a source color space of a source video having a source dynamic range to nonlinear color space signals. A linearizer configured converts the nonlinear color space signals to linearized color space signals having a mastering dynamic range via a piecewise linear interpolation of a transfer function. A color volume transformer applies dynamic color transform metadata associated with the source video on a frame by frame basis to generate master adjusted color space signals from the linearized color space signals. A delinearizer converts the master adjusted color space signals to nonlinearized color space signals via a piecewise linear interpolation of an inverse transfer function in accordance with a display dynamic range. A second color space converter converts the nonlinearized color space signals to display domain signals. Other embodiments are disclosed.

6 Claims, 8 Drawing Sheets

(56) References Cited

U.S. PATENT DOCUMENTS

| | | | | | |
|---|---|---|---|---|---|
| 8,537,177 | B2* | 9/2013 | Bhaskaran | H04N 1/6027 | 345/549 |
| 8,593,480 | B1* | 11/2013 | Ballestad | H04N 1/6027 | 345/581 |
| 8,760,578 | B2* | 6/2014 | Li | H04N 17/02 | 348/571 |
| 8,922,720 | B1* | 12/2014 | Gish | H04N 19/46 | 345/590 |
| 9,025,867 | B2* | 5/2015 | Cote | G06T 1/20 | 382/162 |
| 9,076,224 | B1* | 7/2015 | Shah | G06T 5/009 | |
| 9,100,660 | B2* | 8/2015 | Su | H04N 19/46 | |
| 9,100,662 | B2* | 8/2015 | Puri | H04N 19/176 | |
| 9,219,898 | B2* | 12/2015 | Doser | G09G 5/02 | |
| 9,338,389 | B2* | 5/2016 | Messmer | H04N 5/20 | |
| 2005/0219576 | A1* | 10/2005 | Eun | H04N 1/4072 | 358/1.9 |
| 2008/0137976 | A1* | 6/2008 | Ward | H04N 19/30 | 382/254 |
| 2008/0266459 | A1* | 10/2008 | Butterworth | H04N 9/642 | 348/649 |
| 2009/0027558 | A1* | 1/2009 | Mantiuk | H04N 1/6027 | 348/673 |
| 2009/0290807 | A1* | 11/2009 | Marchesotti | H04N 5/57 | 382/261 |
| 2010/0135634 | A1* | 6/2010 | Ito | G11B 27/034 | 386/302 |
| 2010/0164976 | A1* | 7/2010 | Choe | H04N 5/2351 | 345/590 |
| 2010/0220237 | A1* | 9/2010 | Doser | G09G 5/02 | 348/649 |
| 2011/0134332 | A1* | 6/2011 | Jaynes | G09G 3/3611 | 348/708 |
| 2011/0194618 | A1* | 8/2011 | Gish | G06T 5/50 | 375/240.25 |
| 2011/0305391 | A1* | 12/2011 | Kunkel | H04N 1/6088 | 382/167 |
| 2012/0229495 | A1* | 9/2012 | Longhurst | H04N 1/6058 | 345/590 |
| 2013/0038790 | A1* | 2/2013 | Seetzen | G09G 5/02 | 348/453 |
| 2013/0083855 | A1* | 4/2013 | Kottke | H04N 19/46 | 375/240.18 |
| 2013/0114000 | A1* | 5/2013 | Atkins | H04N 5/20 | 348/708 |
| 2013/0120656 | A1* | 5/2013 | Wilson | G06F 3/1462 | 348/563 |
| 2013/0314495 | A1* | 11/2013 | Chen | H04N 13/0048 | 348/43 |
| 2014/0022460 | A1* | 1/2014 | Li | G06T 5/009 | 348/708 |
| 2015/0007243 | A1* | 1/2015 | Kunkel | H04N 21/234327 | 725/116 |
| 2015/0066923 | A1* | 3/2015 | Ali | H04N 5/262 | 707/736 |
| 2015/0179135 | A1* | 6/2015 | Stauder | H04N 1/6061 | 382/167 |
| 2015/0221280 | A1* | 8/2015 | Van Der Vleuten | H04N 1/6027 | 382/167 |
| 2015/0243243 | A1* | 8/2015 | Greenebaum | G09G 3/2003 | 345/506 |
| 2015/0248747 | A1* | 9/2015 | Atkins | G06T 5/10 | 345/589 |
| 2015/0358646 | A1* | 12/2015 | Mertens | H04N 1/6058 | 382/166 |
| 2016/0005153 | A1* | 1/2016 | Atkins | G06T 5/007 | 345/591 |
| 2016/0155245 | A1* | 6/2016 | Stauder | H04N 1/6058 | 382/167 |
| 2016/0163356 | A1* | 6/2016 | De Haan | H04N 21/23432 | 386/241 |
| 2016/0165256 | A1* | 6/2016 | Van Der Vleuten | H04N 9/68 | 375/240.01 |

* cited by examiner

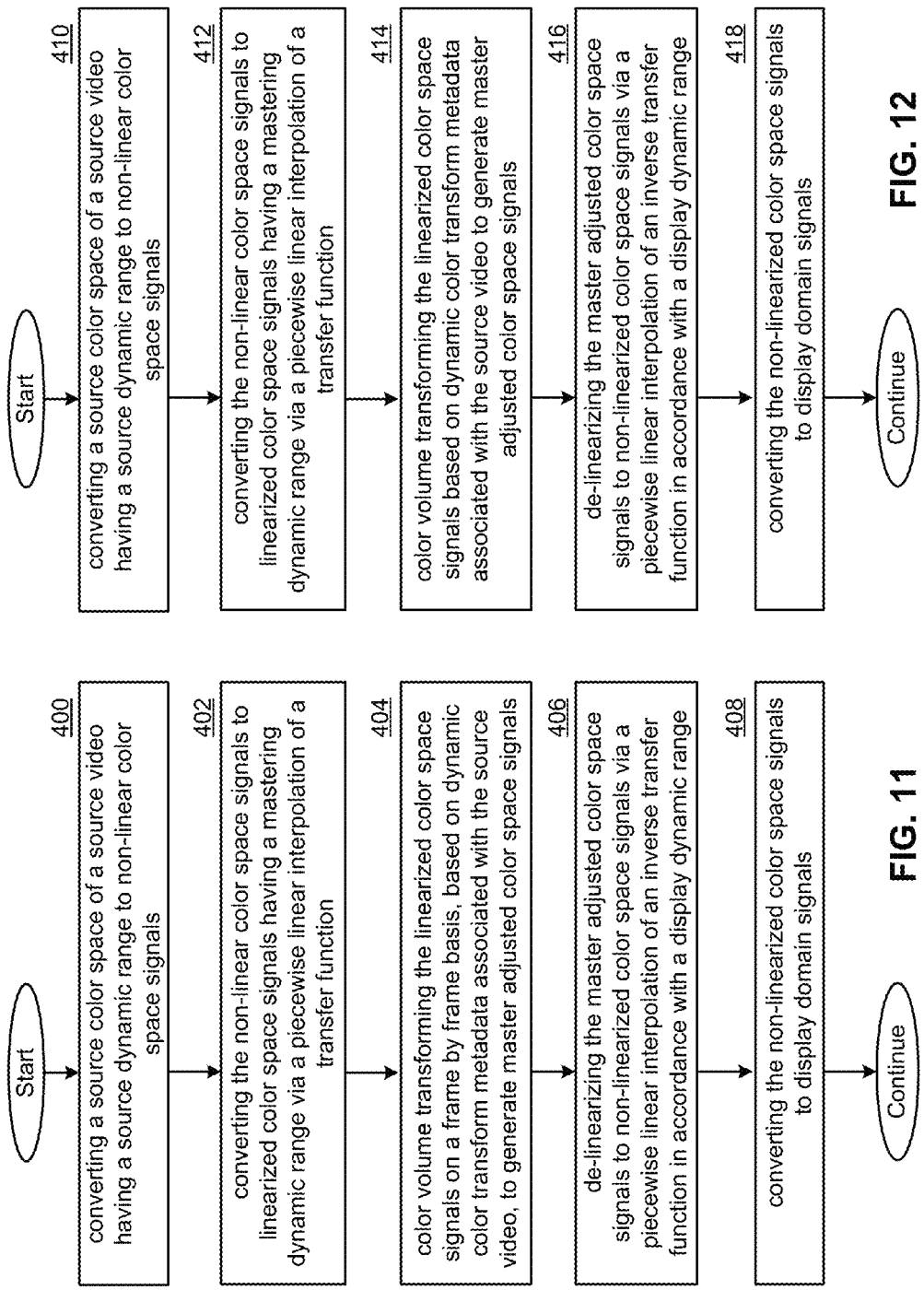

DYNAMIC RANGE CONVERTER WITH FRAME BY FRAME ADAPTATION AND METHODS FOR USE THEREWITH

CROSS REFERENCE TO RELATED PATENTS

The present U.S. Utility patent application claims priority pursuant to 35 U.S.C. §120 as a continuation-in-part of U.S. Utility application Ser. No. 14/863,065, entitled "DYNAMIC RANGE CONVERTER WITH GENERIC ARCHITECTURE AND METHODS FOR USE THEREWITH", filed Sep. 23, 2015, which claims priority pursuant to 35 U.S.C. §119(e) to U.S. Provisional Application No. 62/101,947, entitled "HDR-SDR COLOR SPACE CONVERSION", filed Jan. 9, 2015, both of which are hereby incorporated herein by reference in their entirety and made part of the present U.S. Utility patent application for all purposes.

TECHNICAL FIELD

The present disclosure relates to audio/video systems that process and present audio and/or display video signals.

DESCRIPTION OF RELATED ART

Modern users have many options to view audio/video programming. Home media systems can include a television, a home theater audio system, a set top box and digital audio and/or A/V player. The user typically is provided one or more remote control devices that respond to direct user interactions such as buttons, keys or a touch screen to control the functions and features of the device. Audio/video content is also available via a personal computer, smart-phone or other device. Such devices are typically controlled via a buttons, keys, a mouse or other pointing device or a touch screen.

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. Further, encoding algorithms have been developed primarily to address particular issues associated with broadcast video and video program distribution.

BRIEF DESCRIPTION OF THE SEVERAL VIEWS OF THE DRAWINGS

FIG. 11 presents a flowchart representation of a method in accordance with an embodiment of the present disclosure.

FIG. 12 presents a flowchart representation of a method in accordance with an embodiment of the present disclosure.

DETAILED DESCRIPTION

Figure 1:
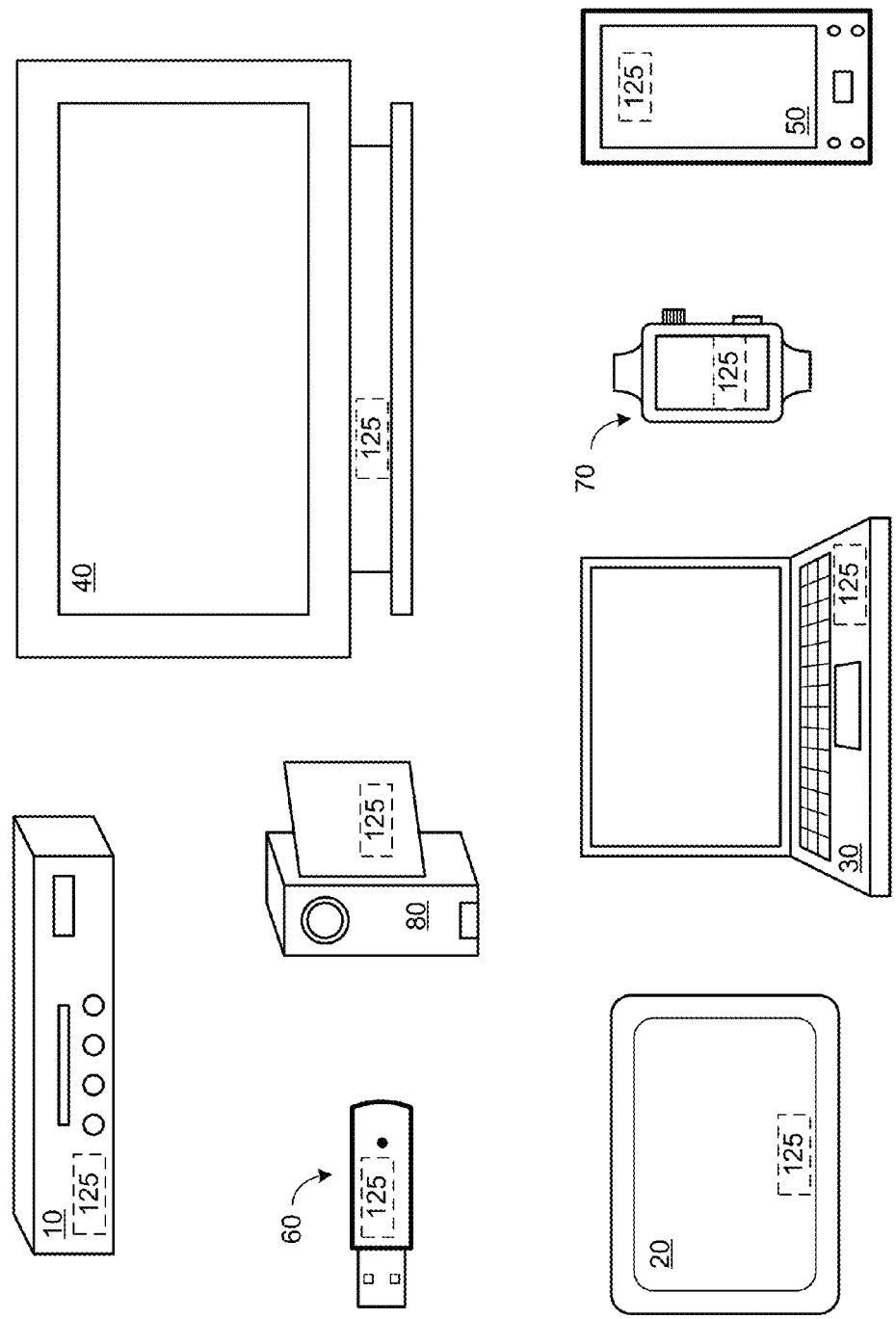
FIG. 1 presents pictorial diagram representations of various video devices in accordance with embodiments of the present disclosure.

FIG. 1 presents pictorial diagram representations of various video devices in accordance with embodiments of the present disclosure. In particular, device 10 represents a set top box with or without built-in digital video recorder functionality or a stand-alone digital video player such as an internet video player, Blu-ray player, digital video disc (DVD) player or other video player. Device 20 represents an Internet tablet. Device 30 represents a laptop, netbook or other personal computer. Device 40 represents a video display device such as a television or monitor. Device 50 represents a smartphone, phablet or other mobile communication device. Device 60 represents a streaming video player. Device 70 represents a smart watch or other wearable computing device with video processing or display functionality. Device 80 represents a handheld video camera.

The devices 10, 20, 30, 40, 50, 60, 70 and 80 each represent examples of electronic devices that incorporate one or more elements of a system 125 that includes features or functions of the present disclosure. While these particular devices are illustrated, system 125 includes any device or combination of devices that is capable of performing one or more of the functions and features described in conjunction with FIGS. 2-13 and the appended claims.

Figure 2:
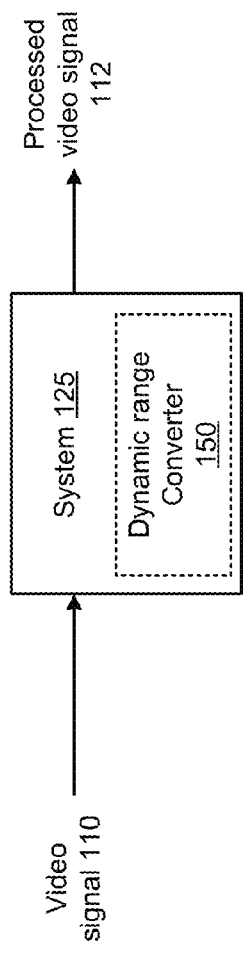
FIG. 2 presents a block diagram representation of a system in accordance with an embodiment of the present disclosure.

FIG. 2 presents a block diagram representation of a system in accordance with an embodiment of the present disclosure. In an embodiment, system 125 receives a video signal 110 and generates a processed video signal 112 via encoding into a digital coding or compression format, decoding from a digital coding or compression format, transcoding from one digital coding and compression format to another digital coding or compression format, etc. The following terms are used:

Luminance: Luminous intensity of a surface in a given direction divided by the projected area of the surface element as viewed from that direction. The units of luminance are candela per square meter (cd/m2). The term luminance as used herein should not to be confused with the term luminance used in television and video to represent a quantity which may more precisely be referred to as "luma".

Dynamic Range: Ratio of largest to smallest luminance

High Dynamic Range (HDR): A term used to describe an image or imaging device that spans or is capable of spanning a range of luminance levels greater than the range of luminance levels spanned by traditional imaging systems. Current standards assume a peak luminance level limited to 10,000 cd/m$^2$.

Standard Dynamic Range (SDR): Peak luminance level commonly defined to be 100 cd/m$^2$ HDR metadata: Parameters transmitted to define the HDR conversion process Electro-Optical Transfer Function (EOTF): Relationship between the nonlinear color values provided to a display device and the linear color values produced by the device.

Inverse Electro-Optical Transfer Function (IEOTF): Function that is inverse of EOTF.

Perceptual Quantizer (PQ): A quantization method taking advantage of the nonlinear response of the human visual system to reduce the number of digital bits to represent an optical signal.

Color value: A number corresponding to the amount of a specific color component (such as R, G, B, or Y) for an image element. Note that prime designations (such as R', G' and B') represent nonlinear color components and non-primed designations (such as R, G and B) represent linear image elements.

Digital code value: Digital representation of an image signal value. Usually representative of a nonlinear color value.

Linear color value: Color Value abbreviated as L, normalized to the range [0,1], that is directly proportional to the optical output of a display device, and which is not directly proportional to the encoded signal representation.

Color volume: Solid in colorimetric space containing all possible colors a display can produce; defined by the color primaries, white point, and luminance range.

Display primaries: Colors of a display from which all other colors of such display are formed through additive combinations.

Maximum display master luminance: The nominal maximum display luminance of the mastering display, represented in candelas per square meter (cd/m^2).

Color Space Converter (CSC): A device that operates via a matrix operation to convert from one color space to another.

Tone mapping: The process of mapping one set of colors to another.

Society of Motion Picture and Television Engineers (SMPTE): An organization that promulgates several standards relating to video processing.

Many modern imaging sensors are capable of delivering linear video signals having dynamic range up to 100 dB, or around 16-bits. This is similar to the dynamic range of the human visual system, which is about 10000:1. Until recently, display panels such as televisions and video monitors were only capable of dynamic range around 100:1. With the advent of higher dynamic range panels, the limitation became the low dynamic range signals supported on the digital interface to the display panels. This precipitated the need for a new quantization device that would squeeze the high dynamic range signal into fewer bits (8, 10, or 12-bits), taking advantage of the nonlinear response of the human visual system. Such a Perceptual Quantizer is discussed in conjunction with SMPTE ST 2084 that presents a standardized transfer function that allows high dynamic range signals to be quantized and coded.

In addition, the SMPTE ST 2086 standard specifies the metadata items to define the color volume (the color primaries, white point, and luminance range) of the display that was used in mastering the video content. This information could be send with an image or scene to inform a consumer display of the characteristics of the mastering display in order to tune itself to recreate the mastering artist's intent originally achieved in the mastering suite. Since ST 2086 is not about dynamic range conversion, this standard does not provide enough information to the consumer display to allow the artist to define how HDR to SDR is to be down converted.

SMPTE ST 2094 addresses the issue of different display devices. In particular, when content mastered with High Dynamic Range (HDR) is transformed for presentation on a display having a smaller color volume, such as Standard Dynamic Range (SDR) display, the color transformation process can be optimized through the use of content-dependent, dynamic color transform metadata rather than using only display color volume metadata (as in ST 2086). Different models of color volume transforms with associated metadata sets may require different processing algorithms and hardware to display the image properly. In ST 2094, provisions are included to support different models, which are called applications and detailed in ST 2094-10 (contribution from Dolby), ST 2094-20 (Philips), ST 2094-30 (Technicolor), and ST 2094-40 (Samsung).

The system 125 includes a dynamic range converter 150 that, for example, converts an HDR video signal to an SDR video signal and/or provides other dynamic range conversion. For example, the video signal 110 can be received via a television receiver, cable television receiver, satellite broadcast receiver, broadband modem, a Multimedia over Coax Alliance (MoCA) interface, Ethernet interface, local area network transceiver, Bluetooth, 3G or 4G transceiver and/or other information receiver or transceiver or network interface that is capable of receiving one or more received signals such as a broadcast video signal, a multicast video signal, a unicast video signal, and/or can be generated from a stored video file, played back from a recording medium such as a magnetic tape, magnetic disk or optical disk. The video signals 110 can include or no include an accompanying audio signal, but video signals may include associated dynamic color transform metadata, such as metadata generated in accordance with SMPTE ST 2094 or other metadata that can be sued to assist in dynamic range conversion.

The video signal 110 and/or processed video 112 can be uncompressed digital signals or be a compressed digital video signal complying with a digital video codec standard such as H.264, MPEG-4 Part 10 Advanced Video Coding (AVC), VC-1, H.265, or another digital format such as a Motion Picture Experts Group (MPEG) format (such as MPEG1, MPEG2 or MPEG4), QuickTime format, Real Media format, Windows Media Video (WMV) or Audio Video Interleave (AVI), etc. The video signal 110 and/or processed video 112 can also include a high definition media interface (HDMI) signal, digital video interface (DVI) signal, a composite video signal, a component video signal, an S-video signal, and/or be formatted in another video format.

Further details regarding the operation of the dynamic range converter 150 including several optional functions and features are presented in conjunction with FIGS. 3-13 that follow.

Figure 3:
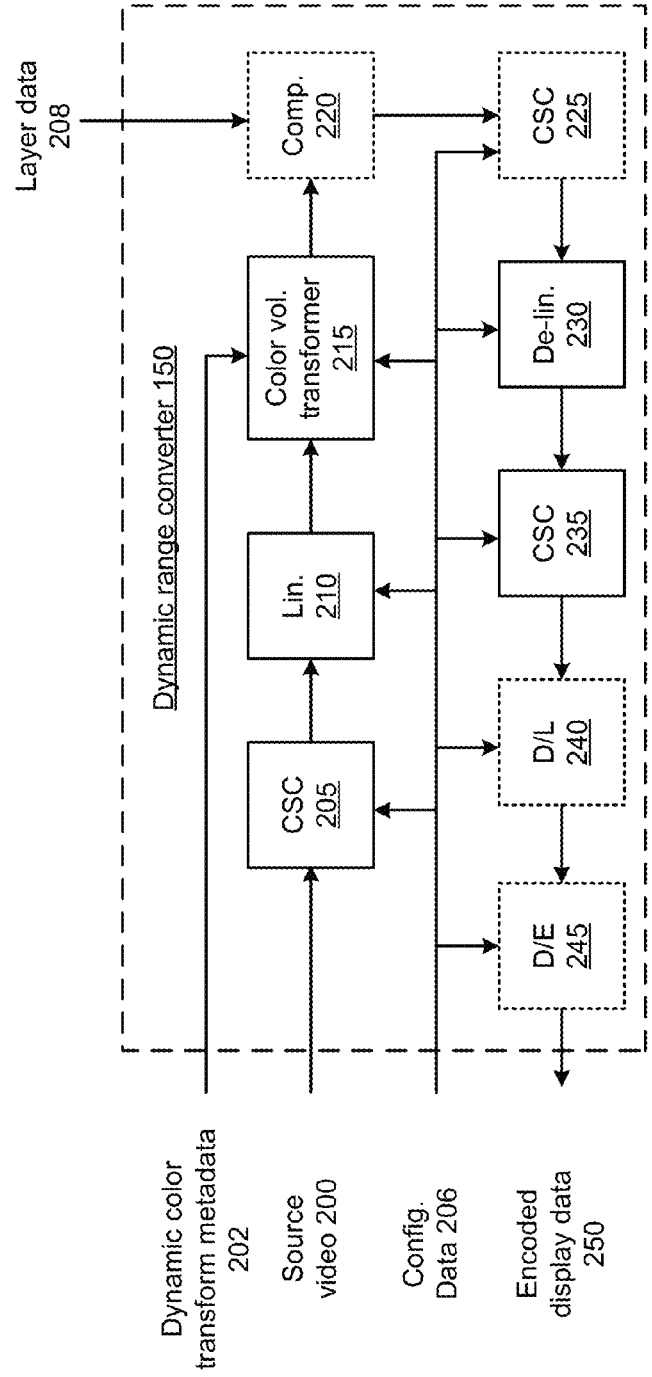
FIG. 3 presents a block diagram representation of a dynamic range converter in accordance with an embodiment of the present disclosure.

FIG. 3 presents a block diagram representation of a dynamic range converter in accordance with an embodiment of the present disclosure. In particular, an embodiment of dynamic range converter 150 is presented that includes color space converters 205 and 235, linearizer 210 and delinearizer 230, color volume transformer 215, and optional compositor 220, color space converter 225, dithering limiter 240 and display encoder 245. In various embodiments, the color space converters 205 and 235, linearizer 210 and delinearizer 230, color volume transformer 215, and optional compositor 220, color space converter 225, dithering limiter 240 and display encoder 245 are implemented via a plurality of circuits such as a plurality of processing devices. Each processing device may be a microprocessor, micro-controller, digital signal processor, vector processor, microcomputer, central processing unit, field programmable gate array, programmable logic device, state machine, logic circuitry, digital circuitry, look-up table and/or any device that manipulates digital signals based on hard coding of the circuitry and/or operational instructions.

The circuits that implement the dynamic range converter 150 can be configurable based on configuration data 206 to differing color spaces, dynamic ranges including a source dynamic range, mastering dynamic range, display dynamic range etc., differing standards including differing dynamic color transform metadata formats, differing color spaces (YCbCr, linear or nonlinear RGB, RGBY, (R−Y), (G−Y), (B−Y), BT.709, BT.601, BT.2020, sRGB, etc.) and other digital formats including input and output formats for each functional block, different encoding standards, frame rates, device resolutions, differing transfer functions and inverse transfer functions, and configuration of other selectable functions and features. In additions, the various individual functional blocks of dynamic range converter 150 can optionally be enabled or disabled depending on the requirements of a particular application of dynamic range converter 150. In addition, the circuits that implement the dynamic range converter 150 can be configured in a processing pipeline for operation timed by a pixel clock, with dynamic color transform metadata 206 applied on a frame by frame basis generate display data that reflects the artistic intent for each frame. In particular, the circuits that implement the dynamic range converter 150 can each include one or more registers or other memory that stores the configuration data 206 such as matrix dimensions, matrix coefficients, weighting coefficients, block enable/disable data, look-up table data representing transfer functions and inverse transfer functions and other configuration parameters used to configure the circuit to the particular conversion process currently being run, and in the case of the color volume transformer 215, to further store the current dynamic color transform metadata 202 corresponding to the current or next frame or scene of the source video 200 being processed.

In operation, the color space converter 205 converts a source color space of a source video 200, having a source dynamic range, to non-linear color space signals. The linearizer 210 converts the non-linear color space signals to linearized color space signals at a mastering dynamic range via a piecewise linear interpolation of a transfer function. The transfer function can be an electro-optical transfer function as specified in SMPTE ST 2084, another electro-optical transfer function, a gamma function of other non-linear compression function. The color volume transformer 215 applies dynamic color transform metadata 202 associated with the source video 200 to generate master adjusted color space signals from the linearized color space signals. Optional compositer 220 layers the master color space signals with further data planes such as layer data 208 and optional color space converter 225 can apply additional color space conversion. The delinearizer 230 converts the master adjusted color space signals (optionally composited with one or more video or graphics layers and/or subjected to additional color conversion) to non-linearized color space signals via a piecewise linear interpolation of an inverse of the transfer function used by linearizer 210 and in accordance with a display dynamic range. The color space converter 235 converts the non-linearized color space signals to display domain signals. The optional dithering limiter 240 reduces a number of bits in display domain signals to generate video display data and the optional display encoder 245 generates encoded video display data 250, based on the display data that indicates the display domain signals.

The dynamic range converter 150 can provide a generic and reconfigurable architecture to cover a wide variety of HDR standards and proposals. In various embodiments, the source dynamic range, mastering dynamic range and/or the display dynamic range are each independently configurable based on the configuration data 206. The shifters of the linearizer 210 can convert the source dynamic range of the color components into a mastering dynamic range that comports with the dynamic color transform metadata applied by color volume transformer 215 to recreate the artist's intent. In a similar fashion, shifters of the delinearizer 230 can convert the mastering dynamic range of the color components into a display dynamic range that, for example, comports with capabilities of the display encoder 245 and/or a display device that will reproduce the video. In this fashion, the dynamic range converter 150 can selectively operate in a first mode of operation where the source dynamic range is a high dynamic range and the display dynamic range is a standard dynamic range at selectable mastering dynamic range levels.

For example, the dynamic range converter 150 can be programmed to support multiple HDR to SDR standard applications such as those proposed in SMPTE working group, "TC-10E DG Dynamic Metadata for Color Transforms of HDR and WCG Images", and/or an ULTRA HD Blu-ray specification, however, other modes reflecting other source and display dynamic ranges are likewise selectable for implementation based on the configuration data 206. In addition, the dynamic range converter 150 is capable of SDR to HDR conversion. While there is no proposed standard method for delivery of SDR plus metadata to an HDR capable display, video can be mastered in HDR and data can be transported that is representative of SDR frames plus information (via metadata) for up conversion of each frame to HDR.

Consider an example where dynamic range converter 150 converts 4k/60 fps HDR source video 200 in the form of 12-bit YCbCr (4:4:4) in the BT.2020 color space to SDR encoded display data 250 in the form of 12-bit HDMI data. After zero-leveling, the HDR data can be represented as 12 fractional bits and 1 sign bit. As discussed above, the functional blocks are pipelines and operate based on a pixel-clock to output individual pixels in the converted format, one pixel per clock cycle. The color space converter 205 converts each pixel in the 12-bit YCbCr color space of a source video 200 at a source dynamic range of 10K cd/m$^2$, to a corresponding pixel in a 20-bit nonlinear R'G'B' color space signals via a 3×3 matrix operation. In particular, each individual linear color value of each pixel is proportional to the luminance value, where 1.0 corresponds to reference luminance, Lref, of 10K cd/m$^2$ defined to be 10,000 cd/m$^2$ in ST 2084.

The linearizer 210 the 20-bit nonlinear R'G'B' color space signals to 20-bit linear RGB color space signals via a piecewise linear interpolation of the EOTF transfer function specified by SMPTE ST 2084 and shifts the data to a mastering dynamic range, Lmastering, of 5K cd/m². By, for example, scaling the linear color values by Lmastering/Lref (0.5 in this case) and then saturating or otherwise normalizing to 1.0 to result in a reduction in the dynamic range if Lmastering<Lref. This reduced dynamic range matches the dynamic range in mastering.

The color volume transformer 215 applies dynamic color transform metadata 202 in accordance with SMPTE ST 2094 associated with the source video 200, on a frame by frame basis, to generate master adjusted color space signals in 20-bit RGB. Color volume transforms are applied to recreate the mastering artist's intent, using metadata generated by the artist for each frame or scene, to prepare the image for dynamic range compression.

Optional compositer 220 layers the master color space signals with further graphics and video planes and optional color space converter 225 applies additional color space conversion to convert to 20-bit RGB via a 3×3 matrix operation. The delinearizer 230 operates via a piecewise linear interpolation of an inverse EOTF transfer function specified by SMPTE ST 2084 to generate 20-bit nonlinear R'G'B' and shifts the data to a display dynamic range, Ldisplay, of 100 cd/m² via a scaling by Ldisplay/Lmastering and saturation or other normalizing back to 1.0. The color space converter 235 converts to 20-bit Y'Cb'Cr' via a 3×3 matrix operation. The dithering limiter 240 reduces a number of bits in display domain signals to generate 12-bit Y'Cb'Cr' video display data and the display encoder 245 generates HDMI encoded video display data 250.

Consider an example where the video signal has 4096× 2160 (4k) resolution and is 60 fps with a frame time of 16.7 ms. The architecture can implement low-latency dynamic range conversion. In various embodiments, the latency can be 0.5 seconds or less or very low latency such as 200 msec or less.

Figure 4:
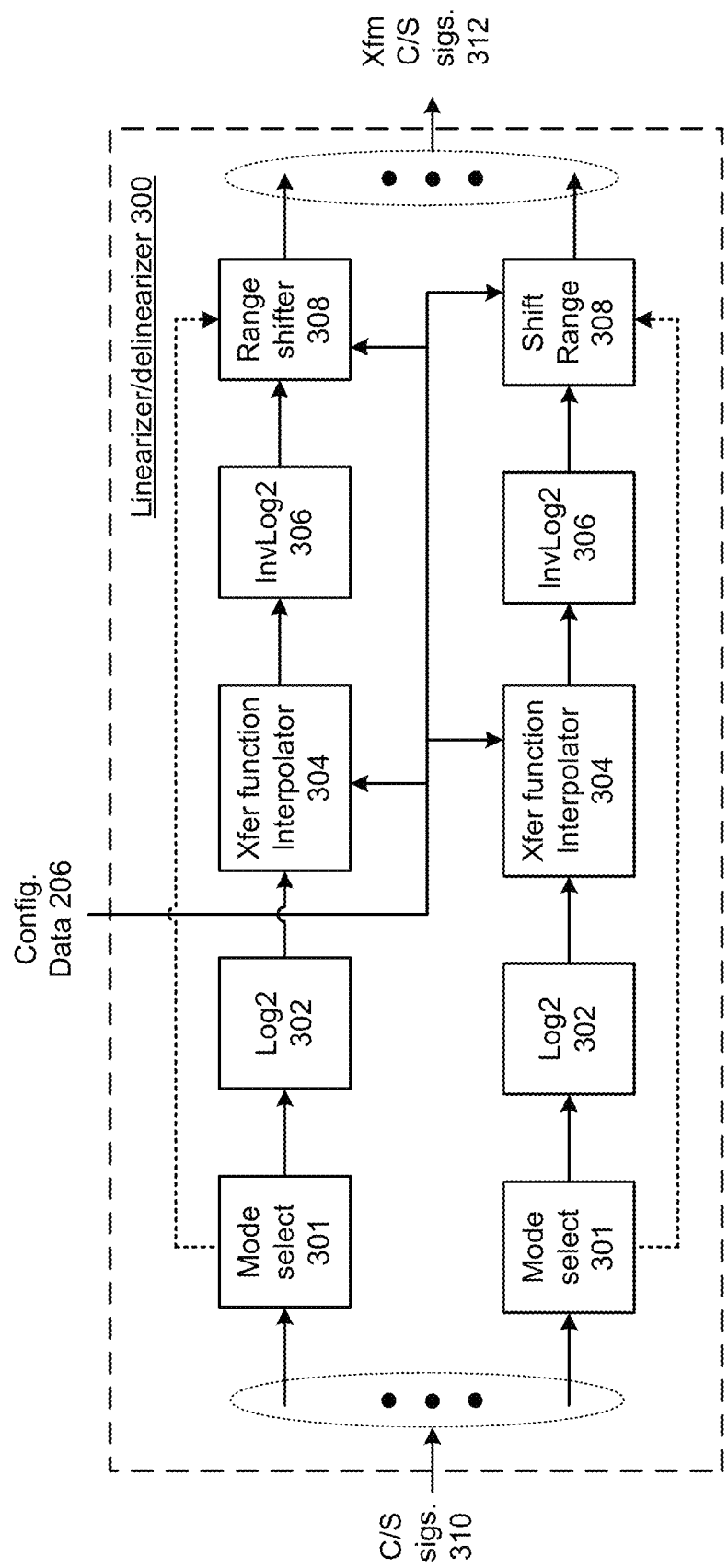
FIG. 4 presents a block diagram representation of a linearizer/delinearizer in accordance with an embodiment of the present disclosure.

FIG. 4 presents a block diagram representation of a linearizer/delinearizer in accordance with an embodiment of the present disclosure. In particular linearizer/delinearizer 300 includes a look-up table that converts an input signal into a log 2 domain signal and determines a slope and intercept based on a piecewise linear representation of a particular log 2 domain transfer function that is programmable based on configuration data 206. An adder and a multiplier generate an interpolated result by interpolating the log 2 domain signal based on the slope and intercept. The look-up table generates an output signal based on an inverse log 2 conversion of the interpolated result that can be shifted to scale the output to a desired dynamic range. The use of log 2 based lookup tables can result in a smaller silicon area and less error (than linear tables), particularly when a nonlinear transfer function is logarithmic or substantially algorithmic.

Considering the example shown, a linearizer/delinearizer 300 is presented that can function as linearizer 210 and/or delinearizer 230 presented in conjunction with FIG. 3. Color space signals 310, such as nonlinear R'G'B' color components in the case of linearizer 210 or linear RGB color components in the case of delinearizer 230, are converted to transformed colors space signals 312 having linear or nonlinear color components as the case may be. The color component x of the color space signals 310 are converted to log 2 domain via log 2 look-up tables 302. Consider the case where a transfer function f(x) (including an inverse transfer function) is implemented, in the log 2 domain, the x is converted to log 2(x), a different function f' is employed where:

$$f'(a)=\log 2(f(a))$$

Since the color space signals 310 have the range [0,1], the log 2 domain conversion results in a log 2 value x for each color component in the range [−xmax,0], where −xmax is the largest negative number that can be represented based on the number of bits in the signal. An optional mode select 301 determines one of a plurality of modes to apply based on the value of x. For example, in the normal case, the value of x itself is converted to log 2(x) used to determine f' (log 2(x)) based on a transfer function interpolator 304 that uses a piecewise linear approximation of a log 2 domain transformation the particular transfer function to generate a corresponding slope, m, and y-intercept, b, of the piece-wise linear function that corresponds to the value of log 2(x). The transfer function interpolator 304 calculates the value of:

$$y=f'(\log 2(x))=m(\log 2(x))+b.$$

In this normal mode, transfer function interpolators 304 generate intercept and slope values indexed by the value of log 2(x) and uses an adder and multiplier to generate the value of f(log 2(x)) in the log 2 domain for inverse log 2 conversion by invlog 2 look-up tables 306.

In cases where x is greater than a predetermined or programmable threshold T1, such as when x is close to 1, the mode select 301 can select a reverse mode where x'=1−x is used instead. This is useful in the case where the transfer function in the log 2 domain does not well for values near 1.0 where there is less resolution. In this case, transfer function interpolators 304 use a look-up of slope and intercept based on:

$$y=f(\log 2(x'))=m(\log 2(x'))+b.$$

In cases where the value of x is smaller than a programmable threshold T2, such as when x is close to 0, the mode select 301 can select a bypass mode that calculates the output directly based on a pre-determined slope $m_0$ and intercept $b_0$. This is useful in the case where the transfer function f(x) is highly linear in the region where x is close to 0. In particular, the log 2 conversion, log 2 domain interpolation and inverse log conversion can be bypassed and the output value can be calculated directly as:

$$y=m_0 x+b_0.$$

As shown, range shifters 308 are programmable based on configuration data 206 to scale the dynamic range of the transform color space signals 312. For example, the range shifters 308 can scale the dynamic range at the input from Lref to Lmaster in the case of linearizer 210, or at the output from Lmaster to Ldisplay, in the case of delinearizer 230.

Figure 6:
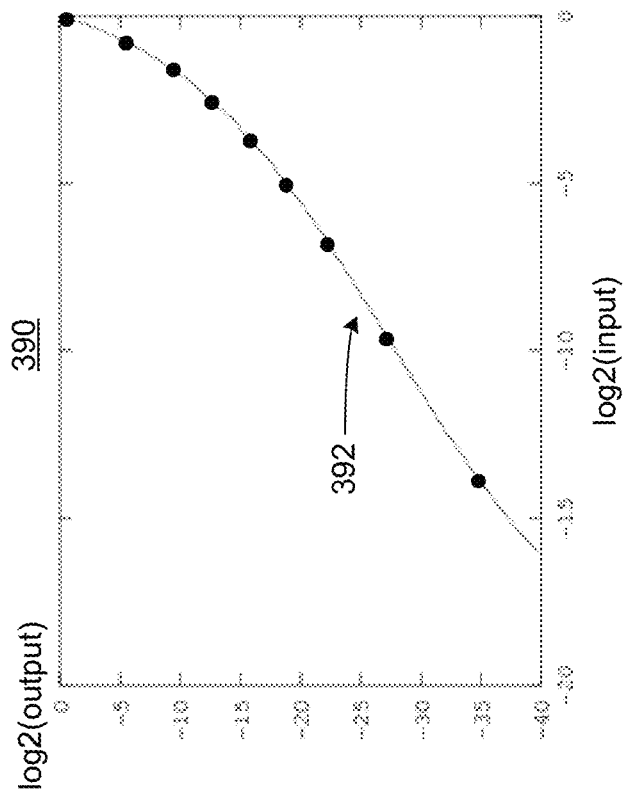
FIG. 6 presents a graphical representation of a log 2 domain transfer function in accordance with an embodiment of the present disclosure.
Figure 5:
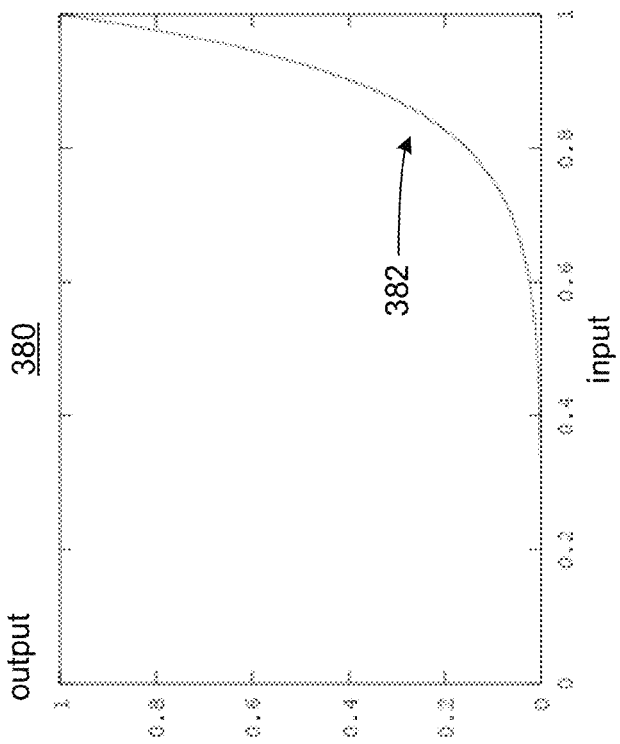
FIG. 5 presents a graphical representation of a transfer function in accordance with an embodiment of the present disclosure.

FIG. 5 presents a graphical representation 380 of a transfer function in accordance with an embodiment of the present disclosure and FIG. 6 presents a graphical representation 390 of a log 2 domain transfer function in accordance with an embodiment of the present disclosure. In particular, the transfer function 382 represents the EOTF as defined in ST 2084, while transfer function 392 represented the EOTF in the Log 2 domain, on a log 2-log 2 scale. When implementing the EOTF function with a piecewise linear lookup table, the table memory contains a fixed number of pieces, or words, delineated by the dark circles on the graph, with corresponding y-intercept and slope values stored as fixed-point integers. In particular, highly linear regions of the function can be implemented via longer segments than regions that are less linear, while maintaining relatively similar error bounds. While a number dark circles are shown that delineate a number of segments, greater or fewer segments can likewise be implemented.

The log 2-domain transfer function is appealing in this implementation because: a) the plot looks substantially linear which lends itself well to the interpolation between fewer segments; b) the values of y-intercept and slope can fit in to a smaller number of bits when represented by fixed-point integers; and c) one programmable table, such as a 64×32 RAM can be used for all the converter's lookup tables providing a great variability of transfer functions through software reconfiguration.

Figure 7:
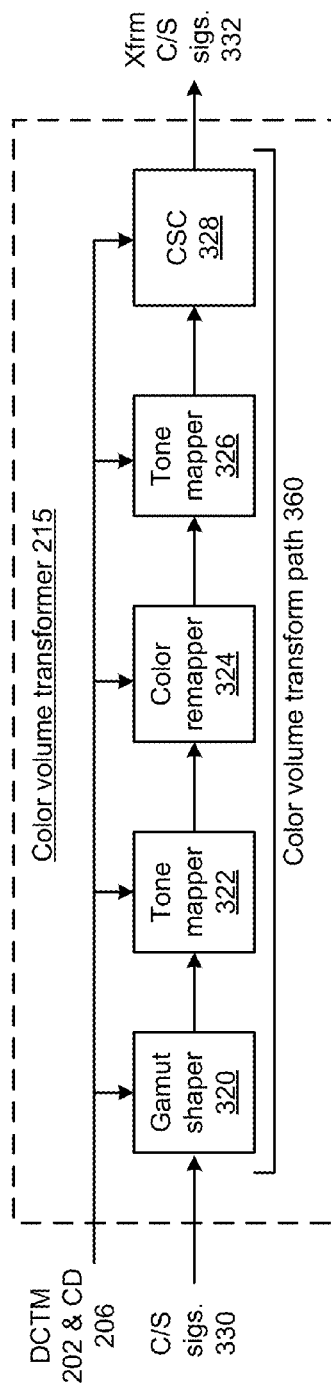
FIG. 7 presents a block diagram representation of a color volume transformer in accordance with an embodiment of the present disclosure.

FIG. 7 presents a block diagram representation of a color volume transformer in accordance with an embodiment of the present disclosure. In particular an implementation of color volume transformer 215 is shown implemented by a series of blocks that can each be implemented by a corresponding circuit in a color volume transform path 360. The blocks in the color volume transform path 360 can be configured in a pipelined configuration and clocked, based on a pixel clock, to produce one pixel output per cycle of the pixel clock. Not only are the blocks of in the color volume transform path 360 independently configurable based on configuration data 206, they are also programmable according to the dynamic color transform metadata 202 that is associated with the source video.

In various embodiments, the color volume transformer 215 applies gamut shaping, luminance tone mapping, chrominance tone mapping and/or additional color space conversion to generates transformed color space signals 332 from color space signals 330. In operation, the gamut shaper 320 applies gamut shaping to linearized color space signals in accordance with the dynamic color transform metadata 202 to generate gamut shaped components. The tone mapper 322 applies chrominance tone mapping by scaling the gamut shaped components in accordance with the dynamic color transform metadata 202 to generate chrominance mapped components. A color remapper 324 color converts the chrominance mapped components in accordance with the dynamic color transform metadata 202 to generate color remapped components. The tone mapper 326 applies luminance tone mapping by scaling the color remapped components in accordance with the dynamic color transform metadata 202 to generate luminance mapped components. The color space converter 328 color converts the luminance mapped components in accordance with the dynamic color transform metadata 202 to generate transform color space signals 312 that are master adjusted to the intent of the artist.

The gamut shaper 320, color remapper 324 and color space converter 328 as well as the tone mappers 322 and 326 can each be implemented via circuits such as a processing device. Each processing device may be a microprocessor, micro-controller, digital signal processor, vector processor, microcomputer, central processing unit, field programmable gate array, programmable logic device, state machine, logic circuitry, digital circuitry, look-up table and/or any device that manipulates digital signals based on hard coding of the circuitry and/or operational instructions.

In particular, the circuits that implement the color volume transformer 215 can be configurable based on configuration data 206 to differing color spaces, dynamic ranges including a source dynamic range, and mastering dynamic range, differing standards including differing dynamic color transform metadata formats, differing color spaces (YCbCr, linear or nonlinear RGB, RGBY, (R–Y), (G–Y), (B–Y), BT.709, BT.601, BT.2020, sRGB, etc.) and configuration of other selectable functions and features. In addition, the circuits that implement the color volume transformer 215 can be configured in a processing pipeline for operation timed by a pixel clock, with dynamic color transform metadata 206 applied on a frame by frame basis to generate transform color space signals 332 that reflect the artistic intent for each frame. In particular, the circuits that implement the color volume transformer 215 can each include one or more registers or other memory that stores the configuration data 206 such as matrix dimensions and look-up table data representing log 2 and inverse log 2 conversions and other configuration parameters used to configure the circuits to the particular conversion process currently being run, and further to store the dynamic color transform metadata 202 such as matrix coefficients, weighting coefficients, and other dynamic color transform metadata 202 corresponding to the current or next frame or scene of the source video 200 being processed.

For example, the color space signals 330 can be 20-bit RGB signals. The gamut shaper 320 can include a color space converter that performs a 4×4 matrix conversion to generate gamut shaped color components in 20-bit RGBY format that are chrominance tone mapped by tone mapper 322 to generate chrominance mapped components in 20-bit RGBY format. The color remapper 324 can include a color space converter that performs a 4×4 matrix conversion to generate 20-bit RGBY color remapped components that are luminance tone mapped by tone mapper 326 to generate tone mapped components in 20-bit RGBY format. The color space converter 328 can perform a 3×4 matrix conversion to generate the transform color space signals 332 in RGB format. The use of 4×4 and 3×4 matrices allow the various blocks to operate based on linear combinations of (R, G, B, Y) in one configuration set by configuration data 206. In other configurations, difference signals such as (R–Y), (G–Y), (B–Y) or 3×3 matrix operations with (R, G, B) can likewise be used. Further details regarding the operation of tone mapper 322 and 326 including several optional functions and features are presented in conjunction with FIG. 8 that follows.

Figure 8:
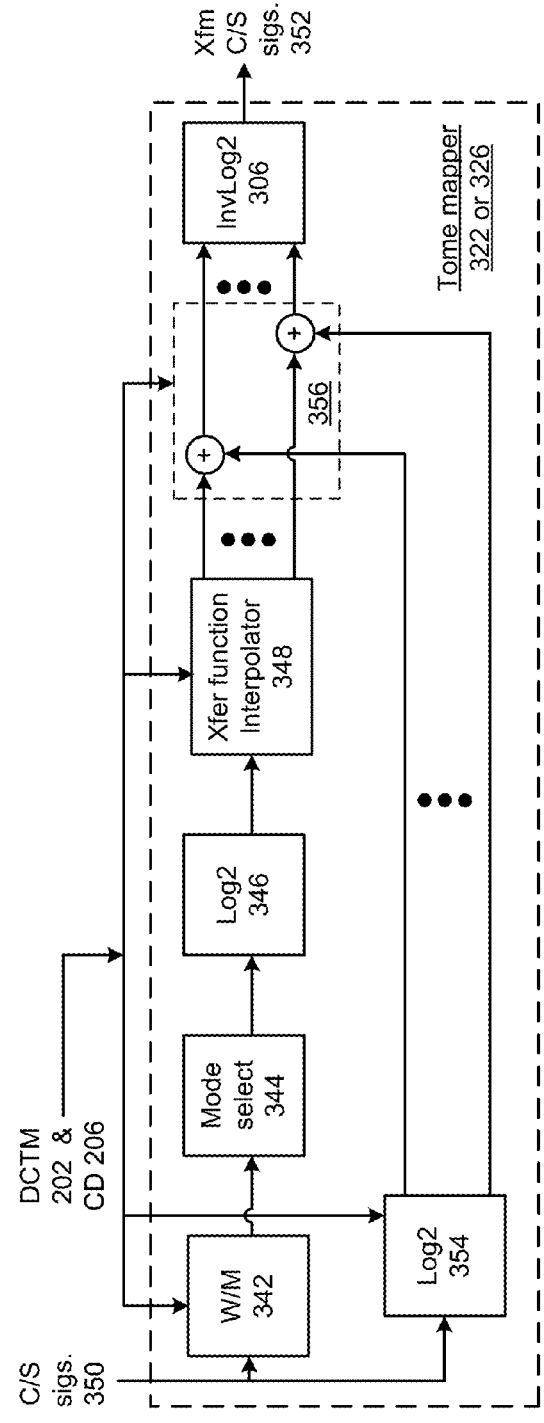
FIG. 8 presents a block diagram representation of a tone mapper in accordance with an embodiment of the present disclosure.

FIG. 8 presents a block diagram representation of a tone mapper in accordance with an embodiment of the present disclosure. In particular a tone mapper 322 or 326 is presented that includes weighting module 342, mode select 344, log 2 look-up tables 346 and 354, transfer function interpolator 348, adders 356 and inverse log 2 look-up table 354. The tone mapper converts color space signals 350 into tone mapped color space signals 352, for example, in formats described in conjunction with FIG. 7.

The tone mapper 322 or 326 can be set in either a scale mode or a translate mode based on the configuration data 206 or dynamic color transform metadata 202. In a chrominance tone mapper implementation (tone mapper 322) that is set in a scale mode, the weighting module 342 generates a weighted maximum of gamut shaped components in formats (such as R, G, B and Y) specified by the dynamic color transform metadata 202 and further based on weighting coefficients established by the dynamic color transform metadata 202. The mode select 344, log 2 look-up table 346 and transfer function interpolator 348 operate in a similar fashion to mode select 301, log 2 look-up table 302 and transfer function interpolator 304, to obtain a scale factor for each of the gamut shaped components.

In a normal mode of operation set by mode select 344 (in the scale mode), the value of the weighted maximum in the log 2 domain is used as an index in three chrominance mapping tables programmed in response to the dynamic color transform metadata to reflect the artist's intent, one for each of the color components (such as R, G and B). Slope and y-intercept values for each of the three components are used to generate these three scale factors. Reverse mode (in the scale mode can be implemented), as previously discussed, by mode select 344 for values of the weighted maximum close to 1. The resulting scale factors in the log 2 domain are added by adders 356 to log 2 domain values of the color components (such as R, G and B) that are generated by log 2 look-up table 354. Adding these values in the log 2 domain operates as multiplication to generate scaled gamut shaped components. Inverse log 2 look-up table 356 generates the chrominance mapped components by inverse log 2 conversion of the scaled gamut shaped components.

When the translate mode is set based on the configuration data 206 or dynamic color transform metadata 202, the weighting module 342, log 2 look-up table 354 and adders 356 are bypassed and the gamut shaped color components (such as R, G and B) in the log 2 domain are directly translated by the transfer function interpolator 348 based on corresponding tables that are programmed in response to the dynamic color transform metadata 202 to reflect the artist's intent. In the case the transfer function interpolator directly generates the chrominance mapped components in the log 2 domain.

In addition to configuration to scale or translate mode as discussed above, the tone mapper 322 or 326 can be configurable based on configuration data 206 to differing mastering dynamic ranges, differing color spaces (RGB, RGBY, (R-Y), (G-Y), (B-Y)) and other differing configurations that implement other selectable functions and features.

In a luminance tone mapper implementation, the components of the tone mapper 326 are implemented similarly to generate transform color space signals 352 in the form of luminance mapped components in response to color space signals 350 in the form of color remapped components. In particular, the transfer function interpolator 348 implements three luminance mapping tables that are programmed in response to the dynamic color transform metadata 202 to reflect the artist's intent.

Figure 9:
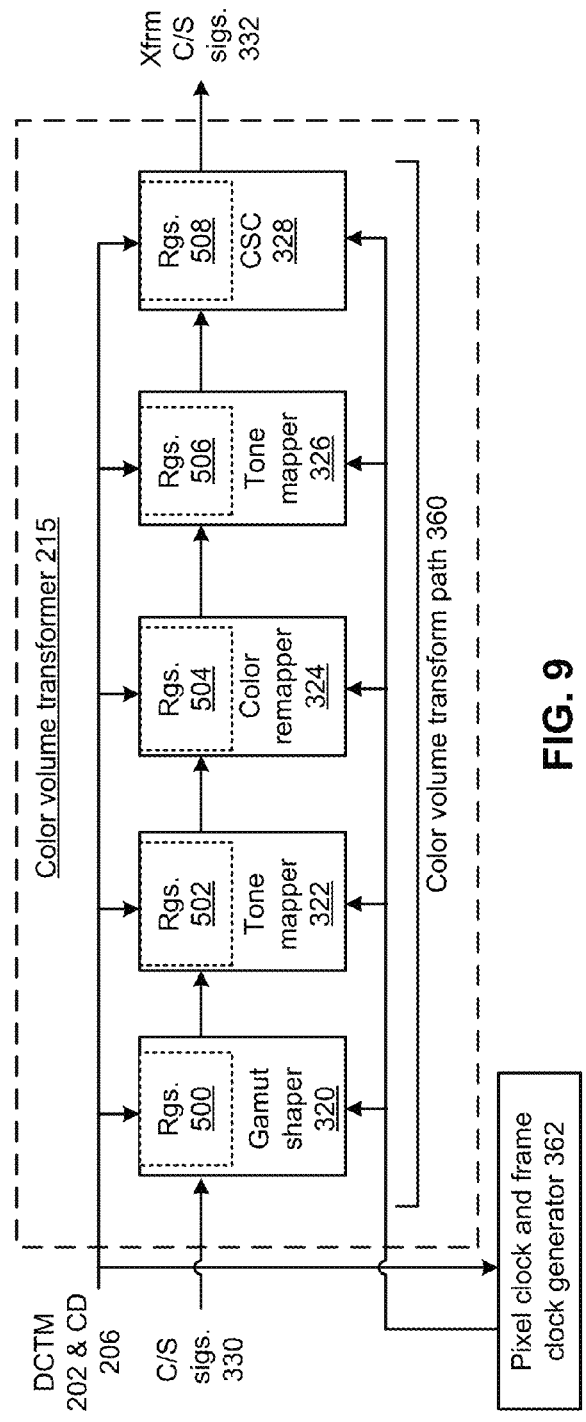
FIG. 9 presents a block diagram representation of a color volume transformer in accordance with an embodiment of the present disclosure.

FIG. 9 presents a block diagram representation of a color volume transformer in accordance with an embodiment of the present disclosure. As discussed in conjunction with FIG. 7, the circuits that implement the color volume transform path 360 of the color volume transformer 215 can be configured in a processing pipeline for operation timed by a pixel clock to produce one pixel output per cycle of the pixel clock 366. In addition, the dynamic color transform metadata 202 can be applied on a frame by frame basis to generate transform color space signals 332 that reflect the artistic intent for each frame. The pixel and frame clock generator 362 is provided to generate the pixel clock and a frame clock based on configuration data that indicates, for example, the frame rate, the number of pixels per frame and/or other timing information.

In various embodiments, the circuits in the color volume transform path 360 can each include a plurality of registers that store the configuration data 206 and the dynamic color transform metadata 202. As shown, gamut mapper 320 includes registers 500, tone mapper 322 includes registers 502, color remapper 324 includes registers 504, tone mapper 326 includes registers 506 and color space converter 328 includes registers 508. Any of the registers 500, 502, 504, 506 and 508 can be implemented by a processor register, cache, buffer memory or other memory that stores the configuration data 206 and dynamic color transform metadata 202. In this fashion, configuration data 206, such as matrix dimensions and look-up table data representing log 2 and inverse log 2 conversions and other configuration parameters can be stored in the corresponding circuits that use this data, to configure each circuit to the particular conversion process currently being run. In addition, the registers or other memory can further store the dynamic color transform metadata 202 such as matrix coefficients, weighting coefficients, and other dynamic color transform metadata 202 in corresponding circuits to conform with the current or next frame or scene of the source video 200 being processed. The registers that store the dynamic color transform metadata 202 for each frame can be shadowed and swapped at frame boundaries to facilitate the frame by frame processing.

In various embodiments, in a time period where an $(n-1)^{st}$ video frame is being processed by the color volume transformer 215, the color volume transformer 215 loads the dynamic color transform metadata 202 associated with an $n^{th}$ video frame of the source video 200 in first ones of the registers 500, 502, 504, 506 and 508. During the next time period, the color volume transformer 215 processes the $n^{th}$ video frame using the dynamic color transform metadata 202 associated with the $n^{th}$ frame of the source video loaded in the first ones of the registers 500, 502, 504, 506 and 508. During that same time period wherein the $n^{th}$ video frame is being processed, the color volume transformer 215 loads the dynamic color transform metadata 202 associated with the $(n+1)^{st}$ video frame of the source video in second ones of the registers 500, 502, 504, 506 and 508. During the next time period, the color volume transformer 215 processes the $(n+1)^{st}$ video frame using the dynamic color transform metadata 202 associated with the $(n+1)^{st}$ frame of the source video loaded in the second ones of the registers 500, 502, 504, 506 and 508. During that same time period wherein the $(n+1)^{st}$ video frame is being processed, the color volume transformer 215 loads the dynamic color transform metadata 202 associated with a $(n+2)^{nd}$ frame of the source video in first ones of the registers 500, 502, 504, 506 and 508, etc.

In this fashion, two sets of registers for each circuit can be alternatively loaded when not in use and swapped back and forth at the boundary of each successive frame as required to meet the needs of the processing of the current video frame. In particular, the frame boundary can be determined based on processing of the last pixel of each frame as indicated based on a frame clock 364 or a counter based on the pixel clock. Because the circuits of color volume transformer 215 are configured in a processing pipeline for operation timed by the pixel clock to produce one pixel output per cycle of the pixel clock, the frame boundary appears for each circuit at staggered times in accordance with the pipelined configuration. In particular, each circuit swaps registers when the frame boundary occurs for that circuit—at the time processing of the last pixel of the prior frame is complete and processing of the first pixel of the next frame is about to begin.

For example, consider the case where there are p pixels in a frame. If the color space converter 328 is processing the pixel p (corresponding to the last pixel in a frame), tone mapper 326 is processing pixel p-1, color remapper 324 is processing pixel p-2, tone mapper 322 is processing pixel p-3 and gamut shaper 320 is processing pixel p-4. At the next cycle of the pixel clock, the color space converter 328 crosses the frame boundary and swaps registers 508 to begin using the dynamic color transform metadata 202 for the new frame to process the pixel 1 (the first pixel in the new frame). At this same time, the tone mapper 326 processes pixel p of the prior frame, color remapper 324 processes pixel p-1 of the prior frame, tone mapper 322 processes pixel p-2 of the prior frame and gamut shaper 320 processes pixel p-3 of the prior frame. At the next cycle of the pixel clock, the color space converter 328 processes pixel 2 of the new frame, the tone mapper 326 crosses the frame boundary and swaps registers 506 to begin using the dynamic color transform metadata 202 of the new frame to begin processing of the pixel 1 of the new frame, color remapper 324 processes pixel p of the prior frame, tone mapper 322 processes pixel p-1 of the prior frame and gamut shaper 320 processes pixel p-2 of the prior frame, etc. It should be noted that the foregoing is merely one example of possible implementations and in further that one or more blocks in the processing pipeline can include one or more functions that operate in sub-pixel time.

Figure 10:
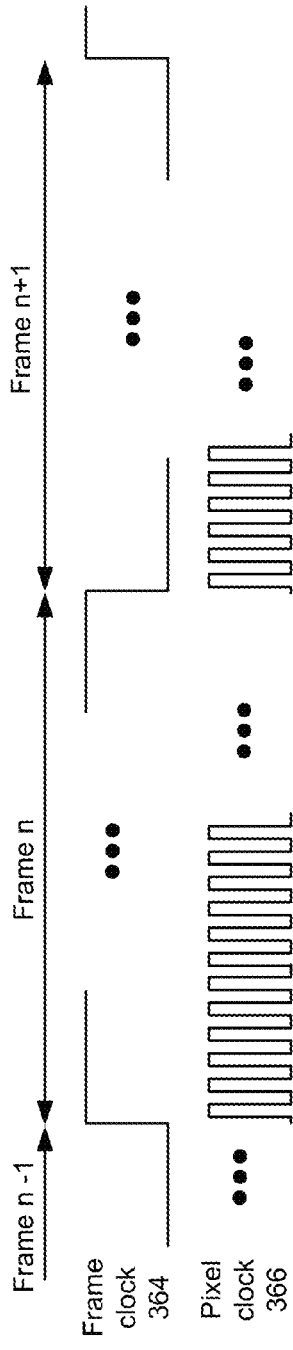
FIG. 10 presents a graphical representation of clock signals in accordance with an embodiment of the present disclosure.

FIG. 10 presents a graphical representation of clock signals in accordance with an embodiment of the present disclosure. In particular, examples of frame clock 364 and pixel clock 366 are presented. In the embodiment shown, the pixel clock 366 has a number of pixel clock cycles for each frame duration corresponding to the number of pixels in each frame. The frame clock 364 shown has two states, each having a duration that corresponds to the duration of a single frame.

As discussed in conjunction with FIG. 9, a pixel and frame clock generator can generate the pixel clock 366 and frame clock 364 based on configuration data 206 that indicates, for example, the frame rate, the number of pixels per frame and/or other timing information. While particular examples of the pixel clock 366 and frame clock 364 are shown, it should be noted that in other embodiments, a frame clock that has a single clock cycle per frame can likewise be implemented. Further, while a single frame clock 364 is shown, a plurality of staggered frame clocks can be used, each timed to correspond to the frame boundary of one of the circuits of color volume transformer 215 in the processing pipeline.

FIG. 11 presents a flowchart representation of a method in accordance with an embodiment of the present disclosure. In particular, a method is presented for use with one or more functions and features discussed in conjunction with FIGS. 1-10. Step 400 includes converting a source color space of a source video having a source dynamic range to nonlinear color space signals. Step 402 includes converting the nonlinear color space signals to linearized color space signals having a mastering dynamic range via a piecewise linear interpolation of a transfer function. Step 404 includes color volume transforming the linearized color space signals on a frame by frame basis, based on dynamic color transform metadata associated with the source video, to generate master adjusted color space signals. Step 406 includes delinearizing the master adjusted color space signals to nonlinearized color space signals via a piecewise linear interpolation of an inverse transfer function in accordance with a display dynamic range. Step 408 includes converting the nonlinearized color space signals to display domain signals.

In various embodiments, the color volume transforming includes: loading in a plurality of first registers prior to a first time period, the dynamic color transform metadata associated with a first video frame of the source video; processing first frame data corresponding to the first video frame of the source video during the first time period using the dynamic color transform metadata associated with the first video frame of the source video loaded in the plurality of first registers; loading in a plurality of second registers during the first time period, the dynamic color transform metadata associated with a second video frame of the source video; processing second frame data corresponding to the second video frame of the source video during a second time period that is after the first time period, using the dynamic color transform metadata associated with the second video frame of the source video loaded in the plurality of second registers; and loading in the plurality of first registers during the second time period, the dynamic color transform metadata associated with a third video frame of the source video.

The color volume transforming can switch from processing of the video data corresponding to the first video frame of the source video to processing of the video data corresponding to the second video frame of the source in response to frame boundary. In addition, the color volume transforming van operate via a plurality of circuits in a pipelined configuration under control of a pixel clock, and the frame boundary can be determined based on processing of the last pixel of the first frame. A plurality of circuits used in the color volume transforming can be switched from processing of the video data corresponding to the first video frame of the source video to processing of the video data corresponding to the second video frame of the source video in response to the frame boundary at staggered times in accordance with the pipelined configuration.

In various embodiments, the method includes configuring at least one configurable circuit based on configuration data, to perform any of the steps 400, 402, 404, 406 or 408. The configuration data can indicate the source dynamic range, the master dynamic range and the display dynamic range. The transfer function can be configured based the configuration data as one of: an electro-optical transfer function or a gamma function and the inverse transfer function is configured based the configuration data as a corresponding one of: an inverse of the electro-optical transfer function or an inverse of the gamma function. The color volume transforming can apply luminance tone mapping and chrominance tone mapping in accordance with a color component space indicated by the configuration data. The color volume transforming can apply gamut shaping, color remapping and additional color space conversion in accordance with a color component space indicated by the configuration data.

In various embodiments, the method can include controlling a plurality of circuits in a processing pipeline via a pixel clock that implements one or more of the steps 400, 402, 404, 406 and 408. Each of the plurality of circuits can output a pixel at a rate of one pixel per clock cycle of the pixel clock. The processing pipeline can further include layering the master color space signals with further data planes prior to delinearizing and/or color converting the master color space signals prior to prior to delinearizing. The color volume transforming can include: applying gamut shaping to the linearized color space signals in accordance with the dynamic color transform metadata to generate gamut shaped components; applying chrominance tone mapping by scaling the gamut shaped components in accordance with the dynamic color transform metadata to generate chrominance mapped components; color converting the chrominance mapped components in accordance with the dynamic color transform metadata to generate color remapped components; applying luminance tone mapping by scaling the color remapped components in accordance with the dynamic color transform metadata to generate luminance mapped components; and color converting the luminance mapped components in accordance with the dynamic color transform metadata to generate the master adjusted color space signals.

FIG. 12 presents a flowchart representation of a method in accordance with an embodiment of the present disclosure. In particular, a method is presented for use with one or more functions and features discussed in conjunction with FIGS. 1-11. Step 410 includes converting a source color space of a source video having a source dynamic range to nonlinear color space signals. Step 412 includes converting the nonlinear color space signals to linearized color space signals having a mastering dynamic range via a piecewise linear interpolation of a transfer function. Step 414 includes color volume transforming the linearized color space signals based on dynamic color transform metadata associated with the source video to generate master adjusted color space signals. Step 416 includes delinearizing the master adjusted color space signals to nonlinearized color space signals via a piecewise linear interpolation of an inverse transfer function in accordance with a display dynamic range. Step 418 includes converting the non to nonlinearized color space signals to display domain signals.

The method can further include layering the master color space signals with further data planes prior to delinearizing and/or color converting the master color space signals prior to prior to delinearizing. The color volume transforming can include: applying gamut shaping to the linearized color space signals in accordance with the dynamic color transform metadata to generate gamut shaped components; applying chrominance tone mapping by scaling the gamut shaped components in accordance with the dynamic color transform metadata to generate chrominance mapped components; color converting the chrominance mapped components in accordance with the dynamic color transform metadata to generate color remapped components; applying luminance tone mapping by scaling the color remapped components in accordance with the dynamic color transform metadata to generate luminance mapped components; and color converting the luminance mapped components in accordance with the dynamic color transform metadata to generate the master adjusted color space signals.

Figure 13:
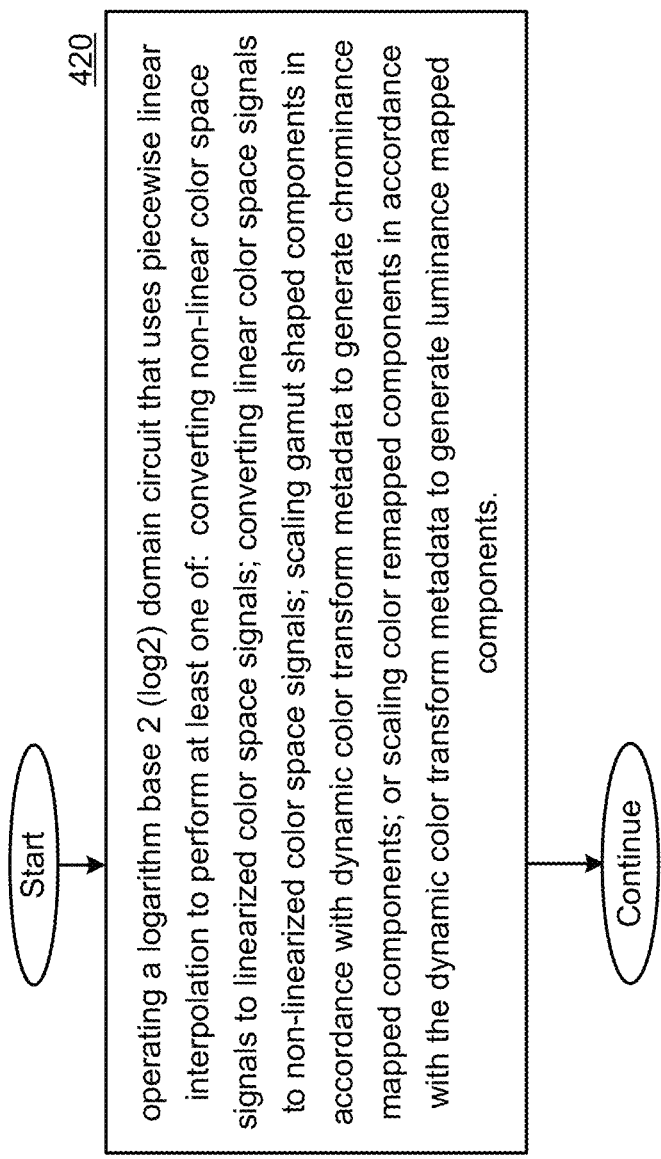
FIG. 13 presents a flowchart representation of a method in accordance with an embodiment of the present disclosure.

FIG. 13 presents a flowchart representation of a method in accordance with an embodiment of the present disclosure. In particular, a method is presented for use with one or more functions and features discussed in conjunction with FIGS. 1-11. Step 420 includes operating a logarithm base 2 (log 2) domain circuit that uses piecewise linear interpolation to perform at least one of: converting nonlinear color space signals to linearized color space signals; converting linear color space signals to nonlinearized color space signals; scaling gamut shaped components in accordance with dynamic color transform metadata to generate chrominance mapped components; or scaling color remapped components in accordance with the dynamic color transform metadata to generate luminance mapped components.

In various embodiments, the log 2 domain circuit is further operated to scale the dynamic range of at least one of: an input signal of the log 2 domain circuit or an output signal of the log 2 domain circuit. The input signal x can represent a positive value less than 1 and wherein for values of x greater than T, the log 2 domain circuit can operate in a reverse mode based on 1−x. The operations of the log 2 domain circuit further include converting an input signal into a log 2 domain signal; determining a slope and intercept based on a piecewise linear representation of a log 2 domain transfer function; generating an interpolated result by interpolating the log 2 domain signal based on the slope and intercept; and generating an output signal based on an inverse log 2 conversion of the interpolated result.

In various embodiments, the log 2 domain transfer function can represent one of: an electro-optical transfer function, a gamma function, an inverse electro-optical transfer function or an inverse gamma function. The operations of the log 2 domain circuit can further include: generating a weighted maximum of the gamut shaped components, based on the dynamic color transform metadata; obtaining a scale factor for the gamut shaped components based on the log 2 domain circuit; multiplying the scale factor by corresponding ones of the gamut shaped components to generate scaled gamut shaped components; and generating the chrominance mapped components via an inverse log 2 conversion of the scaled gamut shaped components. The operations of the log 2 domain circuit can further include: generating a weighted maximum of the color remapped components, based on the dynamic color transform metadata; obtaining a scale factor for the color remapped components based on the log 2 domain circuit; and multiplying the scale factor by corresponding ones of the color remapped components to generate scaled color remapped components and generating the luminance mapped components via an inverse log 2 conversion of the scaled color remapped components.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A dynamic range converter comprising:
   a first color space converter configured to convert a source color space of a source video having a source dynamic range to nonlinear color space signals;
   a linearizer configured to convert the nonlinear color space signals to linearized color space signals having a mastering dynamic range via a piecewise linear interpolation of a transfer function;
   a color volume transformer configured to apply dynamic color transform metadata associated with the source video on a frame by frame basis to generate master adjusted color space signals from the linearized color space signals;
   a delinearizer configured to convert the master adjusted color space signals to nonlinearized color space signals via a piecewise linear interpolation of an inverse transfer function in accordance with a display dynamic range; and
   a second color space converter configured to convert the nonlinearized color space signals to display domain signals;
   wherein the color volume transformer:
      loads a plurality of first registers, prior to a first time period, with the dynamic color transform metadata associated with a first video frame of the source video;
      processes first frame data corresponding to the first video frame of the source video during the first time period using the dynamic color transform metadata associated with the first video frame of the source video loaded in the plurality of first registers; and
      loads a plurality of second registers, during the first time period, with the dynamic color transform metadata associated with a second video frame of the source video;
   wherein the color volume transformer:
      processes second frame data corresponding to the second video frame of the source video during a second time period that is after the first time period, using the dynamic color transform metadata associated with the second video frame of the source video loaded in the plurality of second registers; and loads the plurality of first registers, during the second time period, with the dynamic color transform metadata associated with a third video frame of the source video;

wherein the color volume transformer switches from processing of video data corresponding to the first video frame of the source video to processing of video data corresponding to the second video frame of the source video in response to frame boundary;

wherein the color volume transformer includes a plurality of circuits that operate in a pipelined configuration under control of a pixel clock, and wherein the frame boundary is determined based on processing of the last pixel of the first video frame;

wherein the plurality of circuits of the color volume transformer switch from processing of the video data corresponding to the first video frame of the source video to processing of the video data corresponding to the second video frame of the source video in response to the frame boundary, at staggered times in accordance with the pipelined configuration;

wherein the color volume transformer includes:

a third color space converter configured to that apply gamut shaping to the linearized color space signals in accordance with the dynamic color transform metadata to generate gamut shaped components;

a first tone mapper configured to apply first tone mapping by scaling the gamut shaped components in accordance with the dynamic color transform metadata to generate first mapped components;

a fourth color space converter configured to color converts the first mapped components in accordance with the dynamic color transform metadata to generate color remapped components;

a second tone mapper configured to apply second tone mapping by scaling the color remapped components in accordance with the dynamic color transform metadata to generate second mapped components; and a fifth color space converter configured to color converts the second mapped components in accordance with the dynamic color transform metadata to generate the master adjusted color space signals.

2. The dynamic range converter of claim 1 wherein the first tone mapper operates in accordance with the dynamic color transform metadata to:

generate a weighted maximum of the gamut shaped components;

index the weighted maximum to a piecewise linear lookup table to obtain a scale factor for each of the gamut shaped components; and multiply the scale factor by a corresponding one of the gamut shaped components to generate the first mapped components.

3. The dynamic range converter of claim 1 wherein the second tone mapper operates in accordance with the dynamic color transform metadata to:

generate a weighted maximum of the color remapped components;

index the weighted maximum to a piecewise linear lookup table to obtain a scale factor for each of the color remapped components; and multiply the scale factor by a corresponding one of the color remapped components to generate the second mapped components.

4. The dynamic range converter of claim 1 wherein the linearizer and nonlinearizer are responsive to first configuration data to selectively operate in a first mode of operation where the source dynamic range is a high dynamic range and the display dynamic range is a standard dynamic range are further responsive to second configuration data to selectively operate in a second mode of operation where the source dynamic range is a standard dynamic range and the display dynamic range is a high dynamic range.

5. The dynamic range converter of claim 1 wherein the transfer function is one of: a electro-optical transfer function or a gamma function, and the inverse transfer function is a corresponding one of: an inverse of the electro-optical transfer function or an inverse of the gamma function.

6. A method comprising:

converting a source color space of a source video having a source dynamic range to nonlinear color space signals;

converting the nonlinear color space signals to linearized color space signals having a mastering dynamic range via a piecewise linear interpolation of a transfer function;

color volume transforming the linearized color space signals on a frame by frame basis, based on dynamic color transform metadata associated with the source video, to generate master adjusted color space signals;

delinearizing the master adjusted color space signals to nonlinearized color space signals via a piecewise linear interpolation of an inverse transfer function in accordance with a display dynamic range; and converting the nonlinearized color space signals to display domain signals;

wherein the color volume transforming includes:

loading a plurality of first registers, prior to a first time period, with the dynamic color transform metadata associated with a first video frame of the source video;

processing first frame data corresponding to the first video frame of the source video during the first time period using the dynamic color transform metadata associated with the first video frame of the source video loaded in the plurality of first registers; and loading a plurality of second registers, during the first time period, with the dynamic color transform metadata associated with a second video frame of the source video;

wherein the color volume transforming further includes:

processing second frame data corresponding to the second video frame of the source video during a second time period that is after the first time period, using the dynamic color transform metadata associated with the second video frame of the source video loaded in the plurality of second registers; and loading the plurality of first registers, during the second time period, with the dynamic color transform metadata associated with a third video frame of the source video;

wherein the color volume transforming switches from processing of video data corresponding to the first video frame of the source video to processing of video data corresponding to the second video frame of the source video in response to frame boundary;

wherein the color volume transforming operates via a plurality of circuits in a pipelined configuration under control of a pixel clock, and wherein the frame boundary is determined based on processing of the last pixel of the first video frame, wherein the plurality of circuits switch from processing of the video data corresponding to the first video frame of the source video to processing of the video data corresponding to the second video frame of the source video in response to the frame boundary, at staggered times in accordance with the pipelined configuration;

wherein the color volume transforming further includes:
   applying gamut shaping to the linearized color space signals in accordance with the dynamic color transform metadata to generate gamut shaped components;
   applying first tone mapping by scaling the gamut shaped components in accordance with the dynamic color transform metadata to generate first mapped components;
   color converting the first mapped components in accordance with the dynamic color transform metadata to generate color remapped components;
   applying second tone mapping by scaling the color remapped components in accordance with the dynamic color transform metadata to generate second mapped components; and
   color converting the second mapped components in accordance with the dynamic color transform metadata to generate the master adjusted color space signals.

\* \* \* \* \*